Patented Nov. 14, 1922.

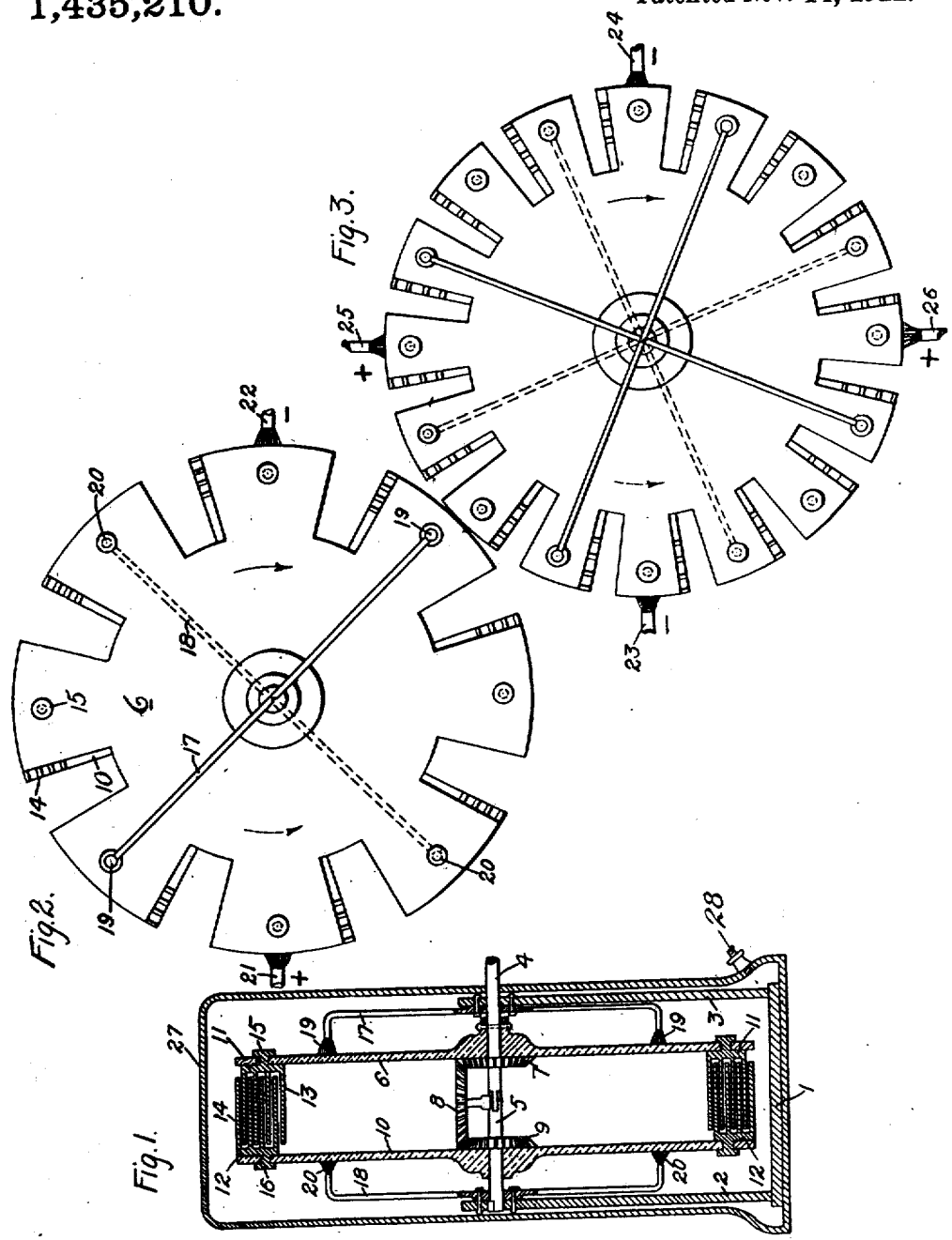

1,435,210

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

HIGH-VOLTAGE-PRODUCING MEANS.

Application filed January 25, 1919. Serial No. 272,999.

*To all whom it may concern:*

Be it known that I, LEWIS W. CHUBB, a citizen of the United States, and a resident of Edgewood Park, in the county of Allegheny and State of Pennsylvania, have invented a new and useful Improvement in High-Voltage-Producing Means, of which the following is a specification.

My invention relates to means for producing high voltage and has particular relation to means of the character designated wherein electrical generating means are placed in an evacuated container for the purpose of effecting the production of extremely high voltages.

In attaining the above mentioned object, I employ a machine which is analogous, in some respects, to an electrostatic influence machine. However, the electrostatic influence machine has not, heretofore, been capable of producing extremely high voltages or large currents, on account of the insulation difficulties which have been experienced, and, moreover, the power which it was possible to derive therefrom was relatively small because the inherent limitations in the construction of such machines precluded the possibility of multi-polar operation and the use of high capacitance within a relatively small space. In machines of the character designated, a plurality of conducting plates are mounted upon relatively rotatable members, and charges are built up on these plates by reason of the electrostatic induction therebetween.

If we assume that there is no leakage of the charge, through corona or surface defects, at no load, the electrostatic charges will be built up by induction in proportion to an exponential function of the time of operation. In all electrostatic influence machines, as heretofore constructed, the charge builds up until the leakage is equal to the generation of electricity or the revolving plates. It is obvious, therefore, that only relatively low voltages may be produced by such machines, since the leakage through any gas is relatively rapid and, therefore, before a substantially high voltage may be built up by induction, the leakage, which increases very rapidly as the voltage approaches an appreciable value, will have dissipated the energy generated by the plates of the machine.

I find that, by placing an electrostatic influence machine of my improved design in a container and evacuating the same, I am able to adapt the machine for multi-polar operation and, moreover, I find that it is possible to use an entirely different form of plate structure than has heretofore been employed, on account of the extremely efficient insulation which is furnished by the vacuum maintained within the container. In other words, without an appreciation of the benefits which are to be realized from the employment of an evacuated container for my apparatus, the operation thereof, to produce an extremely high voltage and current output, is impossible since, while I herein disclose a novel structure for the production of high voltage, its efficient operation is inseparably associated with an evacuated container.

As will hereinafter appear in the detailed description of my invention, I am able to employ multi-plate inducing means, and find that, through the use of an evacuated container, these multi-plate means may be interleaved in such manner that, although they are relatively close to each other in space by position, the efficient insulation afforded by the vacuum admits of an abnormally high voltage being built up on the oppositely-charged members thereof. In this connection, it is well to note that the quantity of electricity which may be stored in any energy-storing means is equal to the product of the capacitance of those means and the difference of potential which exists between them. It is apparent, therefore, that, when the plate members of an energy-storing means are separated and the capacitance thereof rapidly decreases, the voltage will rapidly increase in value because the quantity of electricity which is stored upon the plates will remain the same. This feature is made use of in electrostatic machines in general, and by my improved multi-plate construction in particular, to maintain a relatively high voltage between two energy-deriving means which are associated with the influence machine. However, as has heretofore been pointed out, it is impossible, with the usual form of machine, to maintain the voltage at a value greater than that required to break down the gaseous insulation which exists between the oppositely charged members of the generating means.

For a better understanding of my invention, reference may be had to the accompanying drawing in which Fig. 1 is a sectional view of so much of my improved electrostatic machine as is necessary for a complete understanding thereof; Fig. 2 is a view taken at right angles to that shown in Fig. 1, and illustrates one form which the generating means may assume, and, furthermore, shows a single pair of energy-deriving means which adapt the construction shown in this figure for use in a two-pole machine; and Fig. 3 is a view, similar to Fig. 2, of a modified form of generating means which is adapted for use in a multipolar machine.

Referring now more particularly to Fig. 1, a base plate 1, and supporting members 2 and 3 projecting upwardly therefrom, constitute the supporting structure for the inducing members. A two-part shaft 4—5 is supported by the members 2 and 3, and, as may be observed from Fig. 1 the right-hand portion 4 of the shaft is adapted to be rotated, and, for this purpose, is journaled in the left-hand portion 5 of the shaft, this latter portion of the shaft being rigidly secured to the upright 2. Secured to the rotatable portion 4 of the shaft 4—5 is a non-conducting disc member 6 and attached thereto is a bevel gear wheel 7 adapted to mesh with a gear wheel 8 which is mounted on the stationary portion 5 of the shaft 4—5. The gear wheel 8 meshes also with a gear wheel 9 that is secured to a second non-conducting disc member 10 which is shown as loosely mounted upon the non-rotatable portion 5 of the shaft 4—5. The reason for the construction just described will hereinafter appear in the description of the operation of my machine.

A plurality of circumferentially disposed segmental pieces 11 and 12 are mounted upon the inner faces of the disc members 6 and 10, respectively, each of the pieces 11 and 12 having energy-storing plates 13 and 14 attached thereto or formed integrally therewith, respectively, it being understood that the members 13 and 14 together constitute a structure analogous to a condenser, and, moreover, that they may be relatively moved without any portion of one member touching a portion of the other member, notwithstanding the fact that they are closely inter-leaved during their juxtaposition. Conducting members 15 and 16 are connected to members 11 and 12, respectively, and extend through the supporting non-conducting structures 6 and 10 in such manner that the plate members may be charged from the outer surface of said non-conducting structures. Neutralizing arms 17 and 18 are associated with the rotative disc members 6 and 10, respectively, and carry, at their ends, contact means, here shown as flexible brushes 19—19 and 20—20.

Reference to Fig. 2 will show that the flexible brushes are adapted to make contact with the conducting members 15 and 16, and thereby convey charges from one inductor to the inductor diametrically opposite. In Fig. 2, one pair of neutralizing arms are shown, and in Fig. 3, two pairs, for reasons hereinafter explained.

In order to collect the energy which is accumulated in the inducing devices, I provide pairs of brushes, shown as one pair 21 and 22 in Fig. 2; and as two pairs 23 and 24, and 25 and 26, in Fig. 3, for reasons hereinafter indicated.

The entire operating structure of the machine hereinbefore described is enclosed in a casing 27 which is fluid tight and is adapted to be evacuated, as through an outlet 28.

Having described the construction of the machine for producing high voltages in accordance with my invention, the operation thereof is as follows:

In the following description, I have assumed that the oppositely rotating members 6 and 10 have their segmental portions 11 and 12 substantially opposite each other, just enough separation of the same being shown in Figs. 2 and 3 to indicate the structure. In either the bipolar form of Fig. 2 or the multipolar form of Fig. 3, the operation of my device is substantially the same. When any one of the charged segments 11, on the rotating plate 6, passes opposite a segment 12, on the other plate, and, at the same time, the neutralizing arm 18 contacts with the conducting member 16 of the second-mentioned segment, a charged condenser is produced. Later, the second segment passes away from the neutralizing brush, and the voltage between the two segments is rapidly increased because of the separation of the two segments and consequent reduction in capacity. The brushes 21, 22 or 23, 25 and 24, 26 contact with the segments mid-way between the neutralizing arms to receive an impressed potential difference corresponding to the maximum potentials of the segments.

In an ordinary static influence machine, the voltages and distances between parts are limited by discharges between passing members of the condensers and from different parts of the machine. I will now point out those features in my machine which are novel and which are instrumental in the production of an extremely high voltage not heretofore realized in machines of the character designated.

The opposite rotation of the disc members, which carry the oppositely charged members 13 and 14 of the energy-storing device, is obtained through the rotation of the right-hand portion 4 of the shaft 4—5 and the co-action therewith of the gear wheels 7, 8 and 9, it being understood that the gear wheel 8 rotates about an upstanding portion of the stationary part 5 of the shaft 4—5. In this connection, while I have not shown the shaft portion 4 as associated with any driving means, it is obvious that any well known construction may be utilized. One form which I have found particularly advantageous is that wherein the secondary member of an induction motor is mounted within the evacuated casing and is adapted to rotate the shaft portion 4 while the primary member is positioned outside the casing, the magnetic lines which actuate the rotor of the induction motor not, of course, being in any way impeded by the containing structure 27. This structure is of benefit, since it permits of the influence machine and its driving apparatus being entirely contained within the evacuated chamber.

In Fig. 2, the members 13 and 14 are shown at their positions of maximum condensance. These members are charged in the well known manner but it is apparent that they could not be constructed in a form admitting of close inter-leaving without the provision of a high-vacuum insulation. The members 6 and 10 are rotated, as is usual in influence machines, and the energy stored in the members 13 and 14 is collected therefrom by means of the brushes 21—22 or, in case of the multipolar construction, shown in Fig. 3, by a plurality of pairs of brushes 22—23 and 25—26. In this connection, it should be noted that, if the multipolar construction were attempted without the provision of a vacuum insulation, there would inevitably be a heavy spark pass from brush to brush, and, as the number of pairs of brushes increased in order to adequately multiply the power obtained, it is apparent that the danger of such flash-over would enormously increase.

As will be noted, in the above description of my machine and the operation thereof, the multicellular construction and the adaptation to multipolar operation is impossible without the provision of an evacuated container which furnishes a vacuum equivalent to a high-value insulation which is necessary to prevent the above described leakage and flash-over difficulties.

While I have shown but two embodiments of my invention, it is apparent that influence machines of other forms may be adapted to utilize the principles which I have disclosed, and I desire, therefore, to be adequately protected in the broad features of my invention, and have it limited only by prior art or by the scope of the appended claims.

I claim as my invention:

1. In combination with an electrostatic generator, an evacuated container therefor.

2. In an electrostatic generator, multi-cellular energy-storing means comprising inter-leaved members arranged to have their capacitance alternately increased and reduced, and an evacuated container therefor.

3. In an electrostatic generator, the combination of relatively oppositely rotatable members, supporting means therefor, multicellular energy-storing means associated with said rotatable members, and an evacuated container therefor.

4. In an electrostatic generator, the combination of relatively oppositely rotatable members, supporting means therefor, multicellular energy-storing means associated with said rotatable members, comprising a plurality of re-entrant plate members adapted to be inter-leaved upon the rotation of said oppositely rotatable members, and an evacuated container therefor.

5. In an electrostatic generator, relatively oppositely rotatable supporting members, a shaft on which said members are mounted, multi-cellular energy-storing and restoring means secured to said rotatable members and adapted to be inter-leaved by the rotation thereof, and an evacuated container therefor.

6. In an electrostatic generator, relatively oppositely rotatable supporting members, a shaft on which said members are mounted, multi-cellular energy-storing and restoring means secured to said members and comprising two sections for each of said means, one of said sections being secured to one rotatable member and the other section being secured to the oppositely rotatable member, whereby they may have their capacitance varied by the rotation of said members, and an evacuated container therefor.

7. In an electrostatic generator, relatively oppositely rotatable supporting members, a shaft on which said members are mounted, multi-cellular energy-storing and restoring means secured to said members and comprising two sections for each of said means, one of said sections being secured to one rotatable member and the other section being secured to the relatively oppositely rotatable member, each section being composed of a plurality of re-entrant plate members, which are adapted to be inter-leaved by the rotation of said rotatable members, whereby the capacitance of said energy-storing means may be varied, and an evacuated container therefor.

8. In an electrostatic generator, relatively oppositely rotatable supporting members, a shaft on which said members are mounted, multi-cellular energy-storing and restoring means secured to said members comprising two sections for each of said means, one of said sections being secured to one rotatable member and the other of said sections being secured to the oppositely rotatable member, each section being composed of plurality of re-entrant plate members, extending parallel to said shaft, which are adapted to be inter-leaved by the rotation of said rotatable members, whereby the capacitance of said energy-storing means may be varied, and an evacuated container therefor.

9. In an electrostatic generator, a plurality of relatively oppositely rotating plate members comprising energy-storing means, a plurality of pairs of energy-deriving means associated therewith and adapted to derive energy therefrom, whereby a multi-polar electrostatic generator is constituted, and an evacuated container therefor.

10. In an electrostatic generator, a shaft, supports therefor, members comprising a plurality of radially extending segments mounted on said shaft, means associated with said members and said shaft whereby said members may be oppositely rotated, multi-cellular energy-storing means comprising a plurality of plates extending parallel to said shaft secured to said segments and adapted to be inter-leaved by the opposite rotation thereof, said plates functioning as energy-storing and restoring means, the capacitance of which is varied by their approach and separation, neutralizing arms adapted to touch and connect appropriate plates, brushes engaging said energy-storing means in order to derive energy therefrom, and an evacuated container for the foregoing apparatus.

11. An electrostatic generating device comprising an evacuated container, and a plurality of co-operating plates disposed in relatively close proximity, such evacuation being adapted to prevent excessive leakage between said plates regardless of their proximity.

In testimony whereof, I have hereunto subscribed my name this 21st day of Jan. 1919.

LEWIS W. CHUBB.